Patented Aug. 25, 1942

2,293,775

UNITED STATES PATENT OFFICE 2,293,775

PARA TOLYLETHYL ACETATE

Frank J. Soday, Upper Darby, Pa., assignor to The United Gas Improvement Company, a corporation of Pennsylvania No Drawing. Application August 16, 1939, Serial No. 290,502

10 Claims. (Cl. 260—488)

In general, this invention relates to para methyl styrene acetates and the preparation thereof. These compounds, which are derivatives of para methyl styrene, may also be regarded as para tolylethyl acetates.

More particularly, this invention relates to para tolylethyl acetates, and to their preparation from para methyl styrene derivatives containing substituent groups capable of being replaced with acetate groups.

The para tolylethyl acetates of the present invention may be prepared in several isomeric forms. For example, both alpha and beta para tolylethyl acetates may be prepared by the processes hereinafter described.

These para tolylethyl acetates are, generally speaking, slightly viscous, colorless liquids with very pleasing odors.

They may be used as plasticizing agents for both natural and synthetic resins, plastics, and for coating films in general.

They may also be used as solvents in the formulation of coating compositions such as paints, lacquers, enamels and varnishes.

A particularly desirable application for my novel para tolylethyl acetates embraces their use in perfumes and cosmetic preparations in general. Because of their chemical stability and resistance to hydrolysis, they may be used for perfuming soap and similar materials.

In accordance with this invention, para tolylethyl acetates may be produced from para methyl styrene derivatives obtained from any source. One convenient source of these derivatives comprises hydrocarbon fractions containing para methyl styrene and obtained in the manufacture of artificial gas.

In various processes for the manufacture of artificial gas, such as oil gas, carburetted water gas, or coal gas, considerable quantities of tar are produced and the gas contains substantial quantities of readily condensable material.

Both condensates obtained from the artificial gas, and the light oil obtained upon distillation of the residual tar, constitute sources for many aromatic hydrocarbons. Included among these aromatic hydrocarbons are the unsaturated olefines, and in particular, para methyl styrene having the following general structural formula:

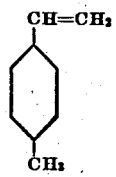

Para methyl styrene may be readily converted into para methyl styrene derivatives due to the unsaturated nature of the styryl radical, i. e., the double bond in the side chain of the styrene nucleus.

For example, para methyl styrene may be readily converted into para tolylethyl derivatives having the following general formulae:

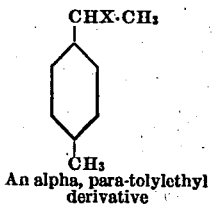
An alpha, para-tolylethyl derivative

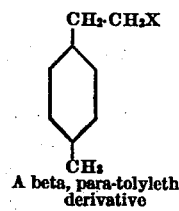
A beta, para-tolylethyl derivative in which X represents a substituent atom or group.

Included among such derivatives may be mentioned the para methyl styrene hydrohalides, and the para methyl styryl alcohols.

In my co-pending application Serial No. 280,725 filed June 23, 1939, I have described a process in accordance with which para methyl styrene may be converted into para methyl styrene hydrohalides by the direct addition of hydrogen halides to para methyl styrene. Both alpha and beta para methyl styrene hydrohalides, and mixtures thereof, may be prepared by the processes therein described. The para methyl styrene hydrohalides may alternatively be described as para tolylethyl halides.

The para methyl styrene hydrohalides thus prepared, may, if desired, be utilized for the production of para tolylethyl acetates by the processes hereinafter described.

In my copending application, Serial No. 290,501, filed August 16, 1939, I have described a process in accordance with which alpha tolylethyl alcohols may be prepared from methyl styrenes and hydrocarbon fractions containing methyl styrenes. Both alpha and beta alcohols of para methyl styrene have been found to be highly suitable for the preparation of tolylethyl acetates by the processes described in the present invention.

Coming now to the procedure contemplated by the present invention, I have found that when a para tolylethyl derivative containing a substituent group in the ethyl radical capable of being replaced with an acetate group, is treated with an acetylation reagent, such for example, as acetic acid or salts of acetic acid, the substituent group is replaced with an acetate group thus forming the para tolylethyl acetate.

For example, when a para tolylethyl derivative having one of the following formulae

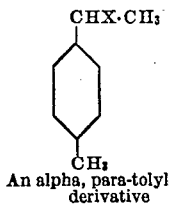 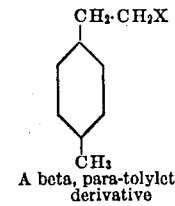

An alpha, para-tolylethyl derivative / A beta, para-tolylethyl derivative is treated with an acetylation reagent, one or the other of the following reactions takes place depending upon the position of the substituent in the ethyl radical.

When an alpha derivative is employed, the reaction may be represented thus, it being understood that acetylating agents other than acetic acid may be used in the process:

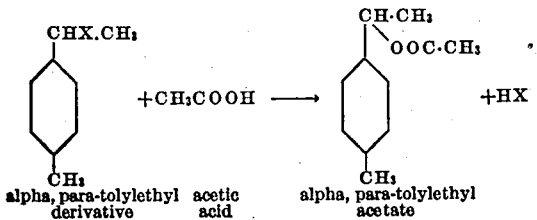

alpha, para-tolylethyl derivative / acetic acid / alpha, para-tolylethyl acetate When a beta derivative is employed, the reaction may be represented thus:

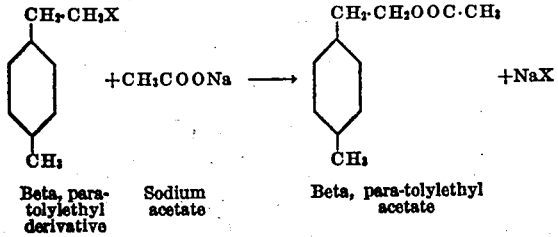

Beta, para-tolylethyl derivative / Sodium acetate / Beta, para-tolylethyl acetate Other acetylating reagents may, of course, be employed.

The substituent atom or group represented by X in the foregoing formulae may be any group capable of being replaced by an acetate group such as, for example, a halogen, an hydroxyl group, or an acidic group such as —HSO₄, —H₃PO₄ and the like.

The following equations illustrate the acetylation of para tolylethyl derivatives wherein the substituent constitutes a halogen atom to produce para tolylethyl acetates.

For the production of alpha, para-tolylethyl acetate the reaction may be represented as follows:

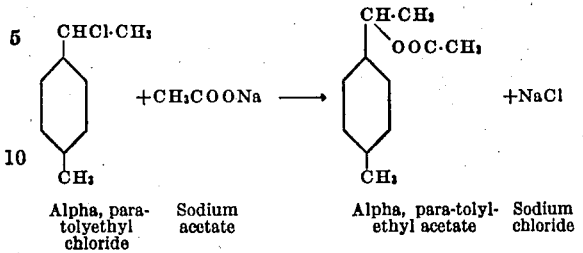

Alpha, para-tolylethyl chloride / Sodium acetate / Alpha, para-tolylethyl acetate / Sodium chloride For the acetylation of beta, para-tolylethyl chloride to form the corresponding beta, para-tolylethyl acetate, the reaction may be represented as follows:

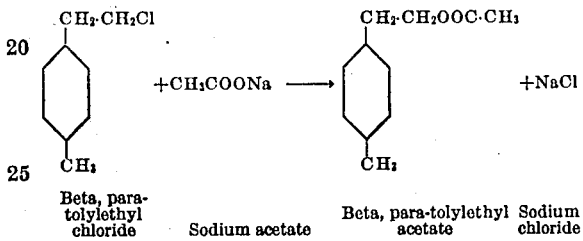

Beta, para-tolylethyl chloride / Sodium acetate / Beta, para-tolylethyl acetate / Sodium chloride Illustrative of para tolylethyl derivatives in which the substituent is a hydroxyl group, may be mentioned the para-tolylethyl alcohols having the following general formulae:

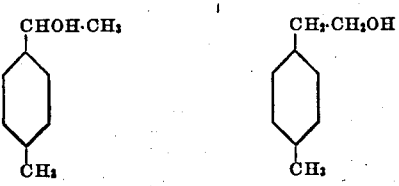

Alpha, para-tolylethyl alcohol / Beta, para-tolylethyl alcohol

The conversion of para tolylethyl derivatives to para tolylethyl acetates may be carried out in any suitable manner, and with any suitable acetylation apparatus.

Any suitable acetylation reagent such as acetic acid or its salts, may be employed as desired.

For example, acetic acid may be employed for the conversion of para tolylethyl alcohols to acetates, and the salts of acetic acid may be used in the conversion of para tolylethyl halides to acetates.

Illustrative of the salts of acetic acid which may be employed as acetylation reagents may be mentioned sodium acetate, potassium acetate, calcium acetate, iron acetate, lead acetate and other salts.

The acetylation reaction may be carried out in the presence of a solvent, such as, for example, benzene, if desired.

Any suitable reaction temperature may be employed, such as, for example, the boiling point of the solution.

The acetylation reaction may be carried out at atmospheric, subatmospheric, or superatmospheric pressures, as desired.

Suitable acetylation catalysts, such as, for example, sulfuric acid, phosphoric acid or anhydrous hydrogen chloride, may be advantageously employed in certain of the reactions, particularly in the conversion of para tolylethyl alcohols to acetates.

The use of a system whereby any water formed by the acetylation reaction can be continuously removed from the system will, in general, be found advantageous from the standpoint of the yield of acetate secured, as well as from the standpoint of the considerable reduction in time necessary to complete the reaction.

One suitable method for effecting the acetylation processes of the present invention comprises refluxing the derivatives with acetylation reagents for a period of several hours.

For example, salts of acetic acid may be refluxed with para tolylethyl halides to produce para tolylethyl acetates. This reaction may, if desired, be effected in the presence of acetic acid.

The para tolylethyl acetates thus produced may be suitably separated from the halogen salts in the reaction mixture, for example, by filtration. If acetic acid has been employed in the reaction, it may be removed by distillation under reduced pressure. Any unremoved acetic acid may then be neutralized with an alkaline solution.

The para tolylethyl acetates obtained by the processes herein described may be isolated and purified in any desired manner.

For example, the reaction mixture may, if desired, be repeatedly extracted with any suitable solvent, such as ether or benzene to increase the yield and purity of the para tolylethyl acetates therein.

The extracts may then be combined and dried over a drying agent such as, for example, anhydrous sodium sulfate after which the extraction solvent employed may be removed by distillation at atmospheric pressure. The residue may then be fractionally distilled in vacuo to obtain a purified para tolylethyl acetate.

Mixtures of alpha and beta para tolylethyl derivatives, in any proportion, may be employed in the preparation of mixtures of alpha and beta para tolylethyl acetates.

Such mixtures of the alpha and beta forms of para tolylethyl acetate may be desired in order to obtain a product possessing a desired boiling range, or desired volatility characteristics, or other desired properties.

For example, a mixture containing the desired proportion of each of the isomeric forms of para tolylethyl halides may be reacted with a salt of acetic acid to obtain a para tolylethyl acetate fraction containing the desired proportion of the isomeric forms of para tolylethyl acetate. Mixtures containing the desired proportion of alpha and beta para tolylethyl halides suitable for use in my process may be obtained, for example, by adding a hydrogen halide to para methyl styrene under the proper conditions to give the desired mixture of isomeric para tolylethyl halides, as set forth more fully in the first of my co-pending applications above referred to.

Similarly, a mixture of the isomeric forms of other para tolylethyl derivatives, such as, for example, the para tolylethyl alcohols, in the desired proportions, may be acetylated to obtain a para tolylethyl acetate fraction containing the desired proportion of the isomeric forms of para tolylethyl acetate.

When mixtures of the isomeric forms of para tolylethyl acetates are obtained, they may, if desired, be separated into fractions containing the individual isomers, by any suitable method, such, for example, as fractionation.

Illustrative of the methods of preparing various para tolylethyl acetates, the following examples are given.

*Example I*

An alpha, para-tolylethyl acetate was prepared by acetylation of an alpha, para-tolylethyl chloride fraction having the following general formula and physical properties:

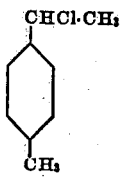

Boiling point = 56.0 to 62.0° C. at 2.5 mm.
Density ($d$ 20/4) = 1.0449
Refractive index ($n$ 20/$d$) = 1.5298

The acetylation was effected by the following procedure.

Approximately 500 parts by weight of this alpha, para-tolylethyl chloride was refluxed with a mixture consisting of approximately 455 parts by weight of anhydrous potassium acetate and 500 parts by weight of glacial acetic acid for a period of approximately four hours. The reaction mixture was then cooled and filtered after which it was distilled under reduced pressure. The residue containing the desired ester and the excess potassium acetate was then treated with a 10% solution of sodium bicarbonate and extracted with ether. The ether extract was then dried with anhydrous sodium sulfate, after which the ether was removed by distillation at atmospheric pressure. The residue was distilled under reduced pressure, whereupon there was obtained approximately 400 parts by weight of alpha, para-tolylethyl acetate having the following general structural formula and physical properties:

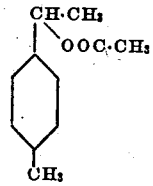

Boiling point = 94–94.5° C. at 5 mm.
= 98° C. at 7 mm.
Density ($d$ 20/4) = 1.0160
Refractive index ($n$ 20/$d$) = 1.49943

This ester was a colorless, somewhat viscous liquid with a flowery ester odor and with a leafy undertone.

*Example II*

Beta, para-tolylethyl acetate was prepared by acetylation of beta, para-tolylethyl bromide having the following general structural formula and physical properties:

Boiling point = 84–85° C. at 4 mm.
= 101–102° C. at 10 mm.
Density ($d$ 20/4) = 1.3096
Refractive index ($n$ 20/$d$) = 1.55519

This acetylation was effected in the following manner.

Approximately 400 parts by weight of this beta, para-tolylethyl bromide and a mixture consisting of approximately 300 parts by weight of anhydrous potassium acetate in approximately 300 parts by weight of glacial acetic acid, were refluxed for four hours on an oil bath heated to approximately 140° C. After cooling, the reaction mixture was filtered by suction to remove the excess potassium acetate, and the potassium bromide formed during the reaction. The filtrate thus obtained was then distilled under reduced pressure to remove the major portion of the acetic acid, after which it was neutralized in the cold with a 10% sodium bicarbonate solution.

The neutralized material was then extracted with ether, and the extracts combined and dried over anhydrous sodium sulfate.

The ether contained in the dried neutralized material was then removed by distillation at atmospheric pressure, after which the residue was distilled in vacuo. There was obtained approximately 300 parts by weight of beta, para-tolylethyl acetate, having the following general structural formula and physical properties.

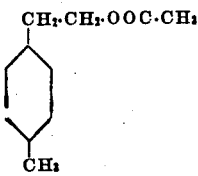

Boiling point = 87-90° C. at 4 mm.
Density ($d$ 20/4) = 1.0368
Refractive index ($n$ 20/$d$) = 1.50180

Example III

Alpha, para-tolylethyl acetate was prepared from an alpha, para-tolylethyl alcohol, having the following structural formula and physical properties.

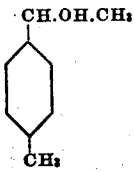

Boiling point = 73-75° C. at 3 mm.
           = 104-107° C. at 13 mm.
Density ($d$ 20/4) = 0.9944
Refractive index ($n$ 20/$d$) = 1.52458

The preparation of alpha, para-tolylethyl acetate proceeded in the following manner.

A mixture consisting of approximately 135 parts by weight of this alpha, para-tolylethyl alcohol, approximately 120 parts by weight of glacial acetic acid, and approximately 120 parts by weight of benzene, was refluxed for a period of approximately four hours. The reflux apparatus was equipped with a trap in which the condensate was collected before being returned to the reaction vessel. In this manner, it was possible to separate the water layer from the reaction product, and thus accelerate the speed of reaction.

The reaction mixture was then distilled at atmospheric pressure and the solvent and excess acetic acid removed. Upon fractionation of the residue in vacuo, there was obtained approximately 140 parts by weight of alpha, para-tolylethyl acetate having the following general structural formula and physical properties.

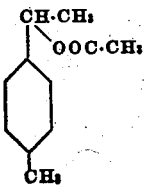

Boiling point = 94-94.5° C. at 5 mm.
           = 98° C. at 7 mm.
Density ($d$ 20/4) = 1.0160
Refractive index ($n$ 20/$d$) = 1.49943

It will be appreciated, of course, that para-tolylethyl acetates may be prepared from pure para-methyl styrene or hydrocarbon fractions containing para-methyl styrene by continuous or semi-continuous processes. For example, such a process may comprise first converting the para-methyl styrene into a para-tolylethyl derivative containing a substituent capable of being replaced with an acetate group, and thereafter effecting acetylation of such a derivative.

In this manner, the processes of the present invention may be combined with the processes disclosed and claimed in my above referred to co-pending applications.

For example, a para-tolylethyl halide may be prepared from a para-methyl styrene fraction obtained by the distillation of light oil from oil gas and this para-tolylethyl halide may then be acetylated to form para-tolylethyl acetate.

Likewise, a para-tolylethyl alcohol may be prepared from such a para-methyl styrene fraction, after which the para-tolylethyl alcohol may be converted into a para-tolylethyl acetate by acetylation.

While representative para tolylethyl acetates and procedures for the preparation thereof have been particularly described, it is to be understood that these are by way of illustration only. Therefore, changes, omissions, additions, substitutions, and/or modifications may be made within the scope of the claims without departing from from the spirit of the invention.

I claim:

1. A process for the preparation of a para tolylethyl acetate comprising treating a para tolylethyl derivative containing a substituent in the ethyl position capable of being replaced with an acetate group, with an acetylating reagent.

2. A process for the preparation of a para tolylethyl acetate comprising treating a para tolylethyl derivative containing a substituent in the ethyl position capable of being replaced with an acetate group, with an acetylating reagent selected from the class consisting of acetic acid and salts of acetic acid.

3. A process for the preparation of a para tolylethyl acetate comprising acetylating a para tolylethyl derivative containing a substituent capable of being replaced with an acetate group, said derivative being selected from the group consisting of alpha and beta para tolylethyl derivatives.

4. A process for the preparation of a para tolylethyl acetate comprising acetylating a para tolylethyl derivative containing a substituent in the ethyl position selected from the class consisting of halogens and hydroxyl groups.

5. A process for the preparation of a para tolylethyl acetate comprising acetylating a para tolylethyl halide.

6. A process for the preparation of a para tolylethyl acetate comprising treating para methyl styrene with a hydrogen halide and thereafter acetylating the para tolylethyl halide thus obtained.

7. A process for the preparation of a para tolylethyl acetate comprising treating a light oil fraction containing para methyl styrene with a hydrogen halide and thereafter acetylating the para tolylethyl halide thus obtained.

8. A process for the preparation of a para tolylethyl acetate comprising treating a light oil fraction containing para methyl styrene and obtained by distillation of light oil from artificial gas manufacture, with a hydrogen halide and thereafter acetylating the para tolylethyl halide thus obtained.

9. A process for the preparation of a para tolylethyl acetate comprising acetylating a para tolylethyl alcohol.

10. A process for the preparation of a para tolylethyl acetate comprising refluxing a para tolylethyl derivative containing a substituent in the ethyl position capable of being replaced with an acetate group, with an acetylating reagent, separating the reaction product thus obtained, and separating the para tolylethyl acetate from the reaction product by fractional distillation.

FRANK J. SODAY.